US008989953B2

(12) United States Patent
Catt et al.

(10) Patent No.: US 8,989,953 B2
(45) Date of Patent: Mar. 24, 2015

(54) METHOD FOR PREDICTING A TRAILING EDGE FLAP FAULT

(71) Applicant: GE Aviation Systems Limited, Cheltenham (GB)

(72) Inventors: Christopher Joseph Catt, Southampton (GB); Julia Ann Howard, Lee-On-The-Solent (GB)

(73) Assignee: GE Aviation Systems Limited, Bishops Cleeve, Cheltenham (GB)

( * ) Notice: Subject to any disclaimer, the term of this patent is extended or adjusted under 35 U.S.C. 154(b) by 0 days.

(21) Appl. No.: 14/065,893

(22) Filed: Oct. 29, 2013

(65) Prior Publication Data

US 2014/0288764 A1  Sep. 25, 2014

(51) Int. Cl.
| | |
|---|---|
| B64F 5/00 | (2006.01) |
| B64C 9/20 | (2006.01) |
| B64C 9/26 | (2006.01) |
| B64C 13/10 | (2006.01) |
| B64D 45/00 | (2006.01) |

(52) U.S. Cl.
CPC .............. *B64F 5/0045* (2013.01); *B64C 9/20* (2013.01); *B64C 9/26* (2013.01); *B64C 13/10* (2013.01); *B64D 45/0005* (2013.01); *B64D 2045/001* (2013.01)
USPC ........................................... 701/31.9

(58) Field of Classification Search
USPC ................ 701/29.1, 31.6, 31.7, 31.8, 31.9; 340/3.43; 324/527, 537
See application file for complete search history.

(56) References Cited

U.S. PATENT DOCUMENTS

| | | | |
|---|---|---|---|
| 3,935,754 A | 2/1976 | Comollo | |
| 5,719,566 A * | 2/1998 | Readman et al. | 340/945 |
| 6,382,566 B1 | 5/2002 | Ferrel et al. | |
| 2006/0097854 A1 | 5/2006 | Basu et al. | |
| 2009/0138147 A1 | 5/2009 | Grinits et al. | |
| 2009/0228409 A1 | 9/2009 | Eklund et al. | |
| 2010/0100355 A1 * | 4/2010 | Marx et al. | 702/183 |
| 2010/0288886 A1 | 11/2010 | Schievelbusch et al. | |

FOREIGN PATENT DOCUMENTS

| | | |
|---|---|---|
| DE | 102005062919 A1 | 7/2007 |
| WO | 2007074173 A2 | 7/2007 |
| WO | 2010046111 A2 | 4/2010 |

OTHER PUBLICATIONS

Search Report for Counterpart GB13022363, Jun. 26, 2013.

* cited by examiner

*Primary Examiner* — Mary Cheung
*Assistant Examiner* — Rodney Butler
(74) *Attorney, Agent, or Firm* — General Electric Company; William S. Munnerlyn

(57) ABSTRACT

A method of predicting a trailing edge flap failure, the method includes receiving a position signal from the position sensor indicative of the position of at least one of the trailing edge flaps, comparing the position signal to a reference position value to define a position comparison, defining a variation comparison and providing an indication of a prediction of a trailing edge flap failure based on the variation comparison.

13 Claims, 3 Drawing Sheets

METHOD FOR PREDICTING A TRAILING EDGE FLAP FAULT

CROSS-REFERENCE TO RELATED APPLICATIONS

This application claims priority under 35 U.S.C. §119 to British Patent Application No. 13022363, filed Feb. 8, 2013, the disclosure of which is incorporated herein by reference in its entirety.

BACKGROUND OF THE INVENTION

Contemporary aircraft may include high lift devices including trailing edge flaps on the trailing edge of the wing. The use of the trailing edge flaps changes the profile of the wing which can increase lift during takeoff or by lowering the stall speed and increasing the drag of the aircraft for landing. Currently, if a fault occurs with one of the trailing edge flaps, the most likely outcome of is the system will cease to move any more, lock out, to prevent damage to the flap and to prevent creating a greater asymmetric lift condition. Further, the pilot may be alerted to the malfunction and the shut-down of the trailing edge flap system.

BRIEF DESCRIPTION OF THE INVENTION

In one embodiment, the invention relates to a method of predicting a trailing edge flap fault in an aircraft having a trailing edge flap system including multiple trailing edge flaps and a flap position sensor, the method comprising receiving a position signal from the flap position sensor indicative of the position of at least one of the trailing edge flaps, comparing the position signal to a reference position value to define a position comparison, determining from the position comparison a variation parameter indicative of the variation of the position signal from the reference position value, comparing the variation parameter to a variation reference value to define a variation comparison, predicting a fault in the trailing edge flap system based on the variation comparison, and providing an indication of the predicted fault.

DESCRIPTION OF EMBODIMENTS OF THE INVENTION

Figure 1:
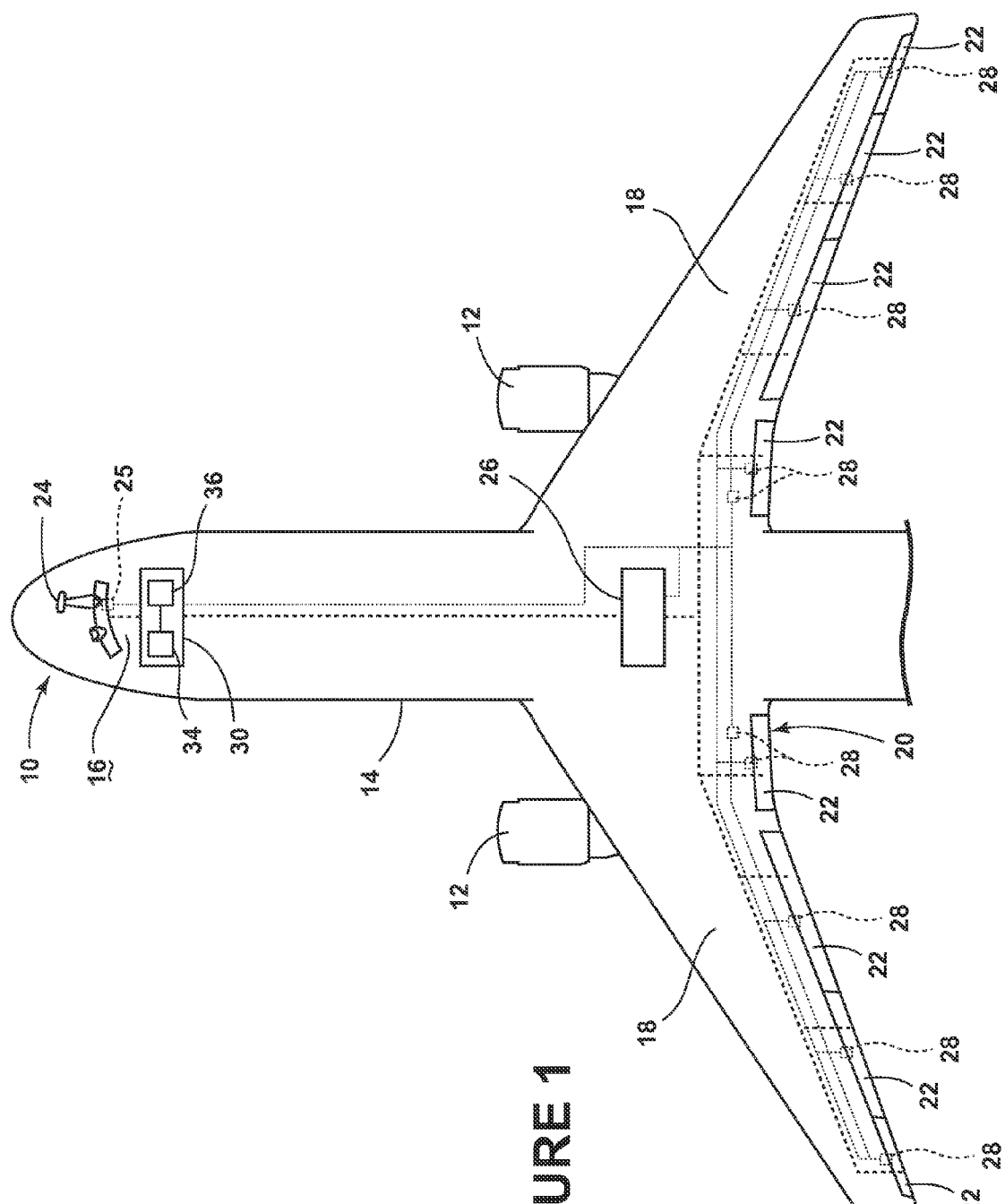
FIG. 1 is a schematic view of an aircraft having an exemplary trailing edge flap system.

FIG. 1 schematically depicts a portion of an aircraft 10 that may execute embodiments of the invention and may include one or more propulsion engines 12 coupled to a fuselage 14, a cockpit 16 positioned in the fuselage 14, and wing assemblies 18 extending outward from the fuselage 14. A trailing edge flap system 20 is included in the aircraft 10 and includes multiple trailing edge flaps 22 on each of the wing assemblies 18. The multiple trailing edge flaps 22 may include hinged surfaces mounted on the trailing edges of each of the wing assemblies 18 to reduce the speed the aircraft 10, to increase the angle of descent for landing, to change the wing profile, and create lift during takeoff There are many different types of trailing edge flaps 22 and their use may depend on the size, speed, and complexity of the aircraft 10 on which they are to be used. Such differing trailing edge flap types are not germane to the embodiments of the invention and will not be described further herein. Further, while four trailing edge flaps 22 have been illustrated on each of the wing assemblies 18 it may be understood that there may be any number of trailing edge flaps 22 on each of the wing assemblies 18.

A flap handle 24 may be included in the cockpit 16 and may be operated by a pilot to set the position of the multiple trailing edge flaps 22. The flap handle 24 may provide an input to a trailing edge flap drive 26, which may be used to move the multiple trailing edge flaps 22 into the positions set by the flap handle 24. More specifically, each of the multiple trailing edge flaps 22 is set to a specific setting by the flap handle 24. It will be understood that while the multiple trailing edge flaps 22 are set to the same position, the angle at which each of the multiple trailing edge flaps 22 is at may not be equal. For example, for a flap setting of five, a first flap may be at 72 degrees, a second flap may be at 127 degrees, a third flap may be at 142 degrees, and a fourth flap may be at 89 degrees. It will be understood that this specification in referencing the angle of the training edge flap may use the term position. The term flap handle as used in this description is not limited to a physical handle, rather it relates to the control device used to set the position of the flaps. Throughout the early part of aviation, this control device was a handle and the term flap handle has now become generic to the control device used to set the flap position, regardless of whether the control device is an actual handle or a button on a touch-screen user interface. Therefore, the specific drive mechanisms may vary and have not been illustrated for the sake of clarity. A flap handle sensor 25 or other suitable mechanism may be used for determining the position of the flap handle 24; that is, the set position of the flaps. In most aircraft, the flaps have a predetermined number of set positions. While the flaps can be variably, even infinitely adjustable, typically the flaps have a predetermined number of fixed positions.

Further, one or more flap position sensors 28 may be included in the trailing edge flap system 20 and each may output a position signal indicative of the position of at least one of the multiple trailing edge flaps 22. For example, a skew sensor may be operably coupled to each of the multiple trailing edge flaps 22 and indicate the angle of each of the multiple trailing edge flaps 22. Furthermore, a position transmitter sensor may be included for each of the wing assemblies 18 and may indicate an overall angle of the multiple trailing edge flaps 22 on each of the wing assemblies 18.

Figure 2:
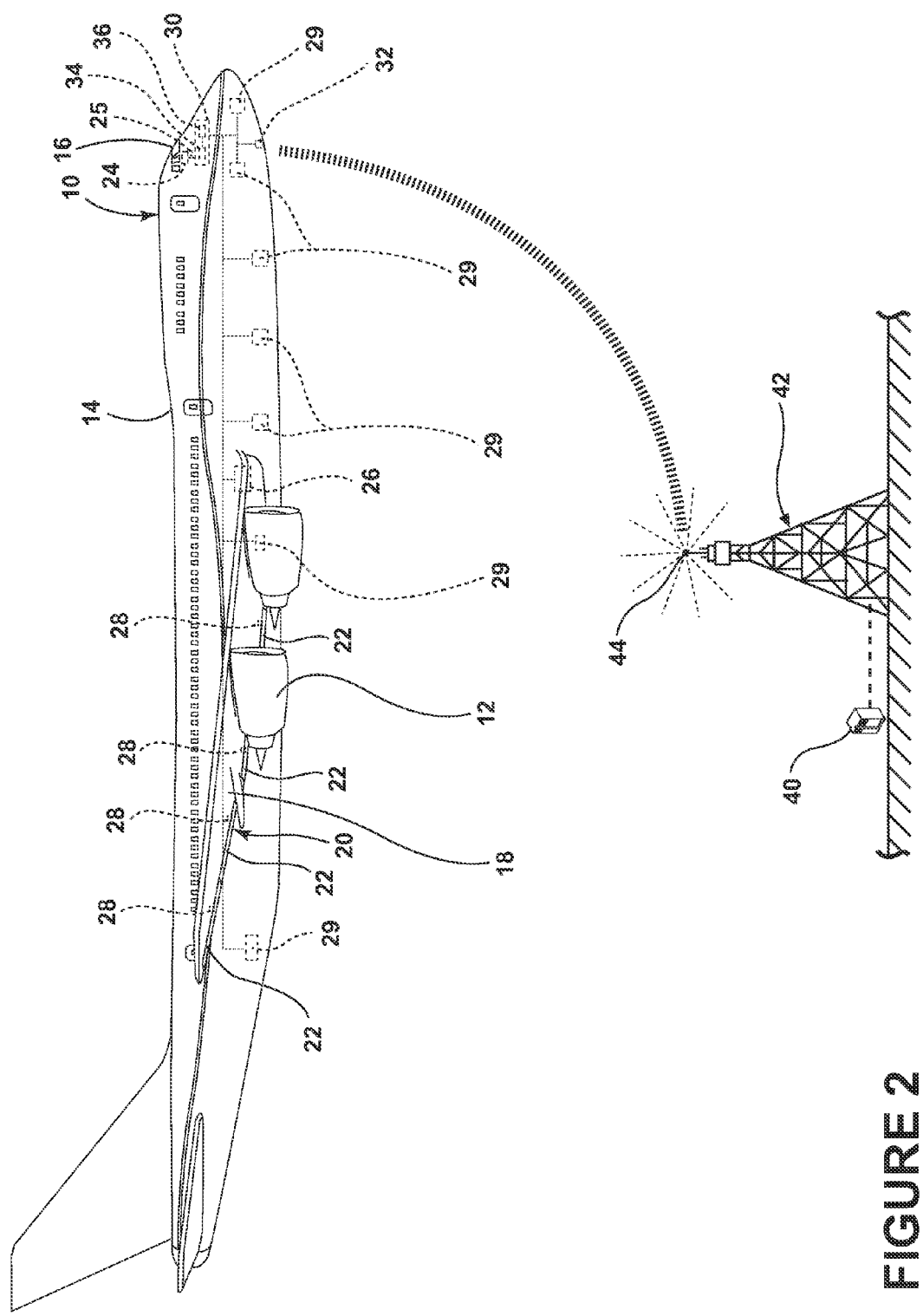
FIG. 2 is a perspective view of the aircraft of FIG. 1 and a ground station in which embodiments of the invention may be implemented.

Referring now to FIG. 2, it may more easily be seen that a plurality of additional aircraft systems 29 that enable proper operation of the aircraft 10 may also be included in the aircraft 10 as well as a controller 30, and a communication system having a wireless communication link 32. The controller 30 may be operably coupled to the plurality of aircraft systems 29 including the trailing edge flap system 20. For example, the trailing edge flap drive 26, the flap handle 24, the flap handle sensor 25, and the one or more flap position sensors 28 may be operably coupled to the controller 30. Further, an autopilot function may be included in the controller 30 and the autopilot may set the position of the multiple trailing edge flaps 22.

The controller 30 may also be connected with other controllers of the aircraft 10. The controller 30 may include memory 34, the memory 34 may include random access memory (RAM), read-only memory (ROM), flash memory, or one or more different types of portable electronic memory, such as discs, DVDs, CD-ROMs, etc., or any suitable combination of these types of memory. The controller 30 may include one or more processors 36, which may be running any suitable programs. The controller 30 may be a portion of an FMS or may be operably coupled to the FMS.

A computer searchable database of information may be stored in the memory 34 and accessible by the processor 36. The processor 36 may run a set of executable instructions to display the database or access the database. Alternatively, the controller 30 may be operably coupled to a database of information. For example, such a database may be stored on an alternative computer or controller. It will be understood that the database may be any suitable database, including a single database having multiple sets of data, multiple discrete databases linked together, or even a simple table of data. It is contemplated that the database may incorporate a number of databases or that the database may actually be a number of separate databases.

The database may store data that may include historical data related to the multiple trailing edge flaps 22 for the aircraft 10 as well as historical trailing edge flap data related to a fleet of aircraft. The database may also include reference values including predetermined reference position values for the angle of multiple trailing edge flaps 22 when the flap handle 24 is in a variety of positions and variation reference values.

Alternatively, it is contemplated that the database may be separate from the controller 30 but may be in communication with the controller 30 such that it may be accessed by the controller 30. For example, it is contemplated that the database may be contained on a portable memory device and in such a case, the aircraft 10 may include a port for receiving the portable memory device and such a port would be in electronic communication with the controller 30 such that the controller 30 may be able to read the contents of the portable memory device. It is also contemplated that the database may be updated through the wireless communication link 32 and that in this manner, real time information such as information regarding historical fleet wide data may be included in the database and may be accessed by the controller 30.

Further, it is contemplated that such a database may be located off the aircraft 10 at a location such as airline operation center, flight operations department control, or another location. The controller 30 may be operably coupled to a wireless network over which the database information may be provided to the controller 30.

While a commercial aircraft has been illustrated, it is contemplated that portions of the embodiments of the invention may be implemented anywhere including in a computer 40 at a ground system 42. Furthermore, database(s) as described above may also be located in a destination server or a computer 40, which may be located at and include the designated ground system 42. Alternatively, the database may be located at an alternative ground location. The ground system 42 may communicate with other devices including the controller 30 and databases located remote from the computer 40 via a wireless communication link 44. The ground system 42 may be any type of communicating ground system 42 such as an airline control or flight operations department.

One of the controller 30 and the computer 40 may include all or a portion of a computer program having an executable instruction set for predicting a trailing edge flap fault in the aircraft 10. Such faults may include improper operation of components as well as failure of components. Regardless of whether the controller 30 or the computer 40 runs the program for predicting the fault, the program may include a computer program product that may include machine-readable media for carrying or having machine-executable instructions or data structures stored thereon. Such machine-readable media may be any available media, which can be accessed by a general purpose or special purpose computer or other machine with a processor. Generally, such a computer program may include routines, programs, objects, components, data structures, algorithms, etc. that have the technical effect of performing particular tasks or implement particular abstract data types. Machine-executable instructions, associated data structures, and programs represent examples of program code for executing the exchange of information as disclosed herein. Machine-executable instructions may include, for example, instructions and data, which cause a general purpose computer, special purpose computer, or special purpose processing machine to perform a certain function or group of functions.

It will be understood that the aircraft 10 and computer 40 merely represent two exemplary embodiments that may be configured to implement embodiments or portions of embodiments of the invention. During operation, either the aircraft 10 and/or the computer 40 may predict a trailing edge flap fault. By way of non-limiting example, while the aircraft 10 is being operated, the flap handle 24 may be utilized to set the position of the multiple trailing edge flaps 22. The flap handle sensor 25 may output a signal indicative of the position of the flap handle 24 and the flap position sensors 28 may output a position signal indicative of the position of the multiple trailing edge flaps 22. Each of the trailing edge flaps 22 should behave consistently when the flap handle 24 sets the position of the multiple trailing edge flaps as it is not possible to set the trailing edge flaps 22 differently. It will be understood that the angle of each flap may be different whilst they are all set to the same position.

The controller 30 and/or the computer 40 may utilize inputs from the flap handle sensor 25, the flap position sensors 28, the database(s) and/or information from airline control or flight operations department to predict the trailing edge flap fault. Among other things, the controller 30 and/or the computer 40 may analyze the data output by the flap position sensors 28 over time to determine drifts, trends, or steps in the operation of the trailing edge flap system 20. Such drifts, trends and steps in the data may be too subtle on a day-to-day comparison to make such predictions of fault. The controller 30 and/or the computer 40 may also analyze the trailing edge flap data to determine differences between the movement of the trailing edge flaps 22 and discrepancies between where the flap handle 24 has set the position and the actual angle or position of the multiple trailing edge flaps 22 to predict faults in the trailing edge flap system 20. Once a trailing edge flap fault has been predicted, an indication may be provided on the aircraft 10 and/or at the ground system 42. It is contemplated that the prediction of the trailing edge flap fault may be done during flight, may be done post flight, or may be done at the end of a defined time period or number or defined number of flights. The wireless communication link 32 and the wireless communication link 44 may both be utilized to transmit data such that the fault may be predicted by either the controller 30 and/or the computer 40.

Figure 3:
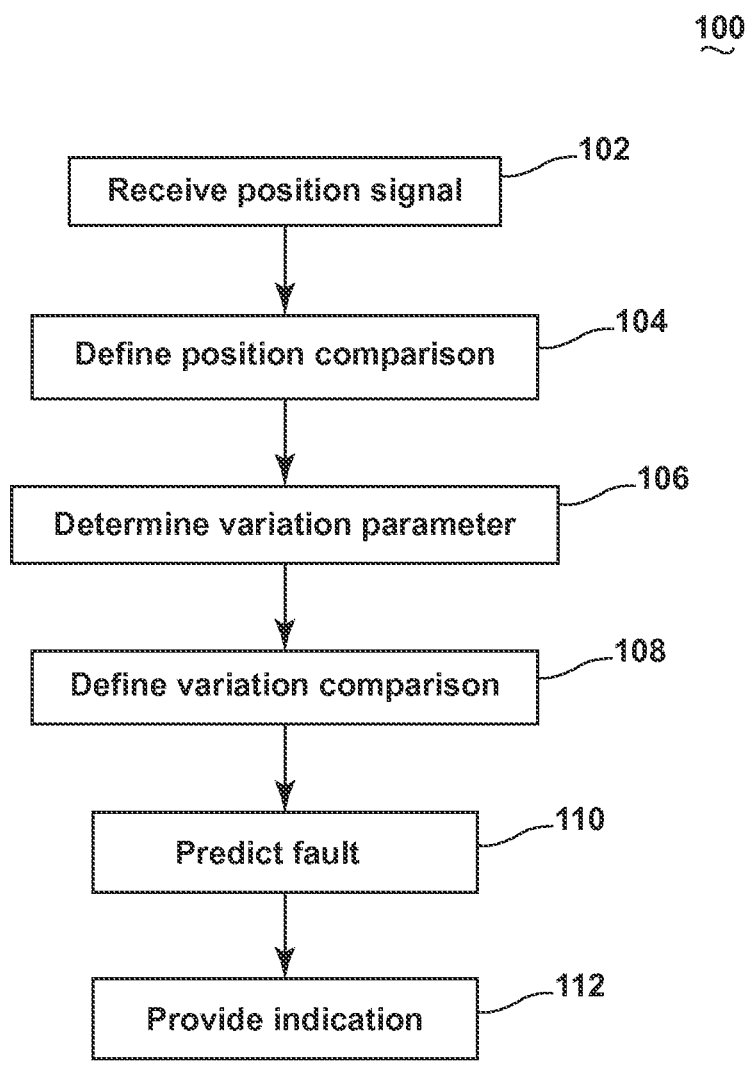
FIG. 3 is a flowchart showing a method of predicting a trailing edge flap fault in an aircraft according to an embodiment of the invention.

In accordance with an embodiment of the invention, FIG. 3 illustrates a method 100, which may be used for predicting a trailing edge flap fault, which can include a failure. The method 100 begins at 102 by receiving a position signal from a position sensor indicative of a position of at least one of the multiple trailing edge flaps 22. This may include receiving a position signal from one of the flap position sensors 28. Alternatively, this may include receiving multiple position signals from the flap position sensors 28, with each position signal corresponding to a different one of the multiple trailing edge flaps 22. Further, the position signal may indicate a collective position of all of the multiple trailing edge flaps 22 on one of the wing assemblies 18.

At 104, the position signal may be compared to a reference position value to define a position comparison. The reference position value may include any number of reference values related to the trailing edge flap system 20. For example, the reference position value may include a value related to a position of any of the multiple trailing edge flaps 22, a collective position of the multiple trailing edge flaps 22 on one of the wing assemblies 18, historical information regarding the position of the at least one of the multiple trailing edge flaps 22, and historical information regarding the collective position of the multiple trailing edge flaps 22 on one of the wing assemblies 18. Furthermore, the reference position value may include a flap handle position. In such an instance, the method may include determining a position of the flap handle 24 such as by receiving an output from the flap handle sensor 25 to define the reference position value. Alternatively, the reference potions values may be stored in one of the database(s) as described above.

In this manner, the position signals received from the flap position sensors 28 may be compared to a reference value to define a position comparison. For example, the position comparison may include comparing at least two of the multiple position signals, with one of the multiple position signals being treated as the reference position value. The position comparison may alternatively include comparing the position signal of trailing edge flaps 22 on the different wing assemblies 18. Any number of comparisons may be made and a variation parameter may be determined from the position comparison as indicated at 106. The variation parameter is indicative of the variation of the position signal from the reference position value.

At 108, the variation parameter, as determined at 106, may be compared to a variation reference value to define a variation comparison. The variation reference value may include at least one threshold value for the comparison. Such a variation reference value may be any suitable value. For example, the variation reference value for the position comparison may be defined based on the tolerance for the various components being compared including the tolerance for the sensors being used. For example, if the position comparison includes comparing a position signal of one of the multiple trailing edge flaps 22 to a reference value then the variation reference value may be defined by tolerances for the trailing edge flap 22 and/or the flap position sensor 28. Alternatively, if the controller 30 and/or the computer 40 is tracking the variation over time of each predetermined flap position to the sensed flap position, then the variation reference value may be related to an acceptable change in the variation over time. Further still, if the position signal being compared is one of a maximum flap position over time or a minimum flap position over time. Then the variation reference value may be related to an acceptable change to determine if the flap is slowly limiting its movement over time.

At 110, a fault in the trailing edge flap system may be predicted based on the variation comparison. For example, a fault in the trailing edge flap system 20 may be predicted when the variation comparison has been determined to satisfy a predetermined threshold value. In this manner, the controller 30 and/or the computer 40 may determine if the variation comparison is acceptable. The term "satisfies" the threshold is used herein to mean that the variation comparison satisfies the predetermined threshold, such as being equal to, less than, or greater than the threshold value. It will be understood that such a determination may easily be altered to be satisfied by a positive/negative comparison or a true/false comparison. For example, a less than threshold value can easily be satisfied by applying a greater than test when the data is numerically inverted. In implementation, the reference values and comparisons may be converted to an algorithm to predict faults in the trailing edge flap system 20. Such an algorithm may be converted to a computer program comprising a set of executable instructions, which may be executed by the controller 30 and/or the computer 40.

At 112, the controller 30 and/or the computer 40 may provide an indication of the fault in the trailing edge flap system 20 predicted at 110. The indication may be provided in any suitable manner at any suitable location including in the cockpit 16 and at the ground station 42. For example, if the controller 30 ran the program, then the suitable indication may be provided on the aircraft 10 and/or may be uploaded to the ground system 42. Alternatively, if the computer 40 ran the program, then the indication may be uploaded or otherwise relayed to the aircraft 10. Alternatively, the indication may be relayed such that it may be provided at another location such as such as an airline control or flight operations department.

It will be understood that the method of predicting a trailing edge flap fault is flexible and the method illustrated is merely for illustrative purposes. For example, the sequence of steps depicted is for illustrative purposes only, and is not meant to limit the method 100 in any way as it is understood that the steps may proceed in a different logical order or additional or intervening steps may be included without detracting from embodiments of the invention. By way of non-limiting example, multiple position signals may be compared to a number of reference position values to define numerous position comparisons. For example, the method may compare the position of a flap to the position of another flap and may compare the position of the flap to the flap handle position. Additionally, the method may compare multiple sensor signals on a single wing to a theoretical reference position or compare multiple sensor signals on a wing to multiple sensors on the other wing, etc. Through these comparisons a number of variation parameters may be determined therefrom and compared to numerous variation reference values to define numerous variation comparisons. Subsequently a trailing edge flap fault may be predicted based on the numerous variation comparisons.

Technical effects of the above described embodiments include that data gathered by the aircraft during flight may be utilized to predict trailing edge flap faults. This allows such predicted faults to be corrected before the trailing edge flap system is locked out due to a determined fault. Currently the recording of fault occurrences is discretionary and requires the fault to be entered manually into a database this is costly and may not obtain all the relevant information. Further, there is currently no manner to predict the fault of a trailing edge flap. The above described embodiments may result in many benefits including improved flight performance, which can have a positive impact on both operating costs and safety. The above embodiments allow accurate predictions to be made regarding the trailing edge flap system faults. This allows for cost savings by reducing maintenance cost, rescheduling cost, and minimizing operational impacts including minimizing the time aircraft are grounded.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of predicting a trailing edge flap fault in an aircraft having a trailing edge flap system including multiple trailing edge flaps, a flap handle for setting the position of the trailing edge flaps, and a flap position sensor, the method comprising:
   receiving a position signal from the position sensor indicative of a position of at least one of the trailing edge flaps;
   comparing the position signal to a reference position value to define a position comparison;
   determining from the position comparison a variation parameter indicative of the variation of the position signal from the reference position value;
   comparing the variation parameter to a variation reference value to define a variation comparison;
   predicting a fault in the trailing edge flap system based on the variation comparison; and
   providing an indication of the predicted fault.

2. The method of claim 1 wherein the receiving the position signal comprises receiving multiple position signals, with each position signal corresponding to a different trailing edge flap.

3. The method of claim 1 wherein the reference position value comprises historical information regarding the position of the at least one of the trailing edge flaps.

4. The method of claim 1, further comprising determining a flap handle position, which controls an angle of the trailing edge flaps.

5. The method of claim 1 wherein the position signal indicates a collective position of all of the trailing edge flaps on a wing.

6. The method of claim 1 wherein the variation reference comprises at least one threshold value for the position signal.

7. The method of claim 1, further comprising determining the prediction of the trailing edge flap fault when the variation comparison is greater than a threshold value.

8. The method of claim 2 wherein the position comparison comprises comparing at least two of the multiple position signals, with one of the multiple position signals being treated as the reference position value.

9. The method of claim 4 wherein the reference position value comprises the flap handle position.

10. The method of claim 5 wherein the reference position value comprises a collective position of the trailing edge flaps on another wing.

11. The method of claim 5 wherein the reference position value comprises a flap handle position.

12. The method of claim 5 wherein the reference position value comprises historical information regarding the collective position of all of the trailing edge flaps on the wing.

13. The method of claim 8 wherein the position comparison comprises comparing the position signal of trailing edge flaps on different wings.

* * * * *

UNITED STATES PATENT AND TRADEMARK OFFICE
CERTIFICATE OF CORRECTION

| | | |
|---|---|---|
| PATENT NO. | : 8,989,953 B2 | Page 1 of 1 |
| APPLICATION NO. | : 14/065893 | |
| DATED | : March 24, 2015 | |
| INVENTOR(S) | : Catt et al. | |

It is certified that error appears in the above-identified patent and that said Letters Patent is hereby corrected as shown below:

On the Title Page, item (71), under "Applicant", in Column 1, Line 1, delete "Limited," and insert -- Limited, Bishops Cleeve --, therefor.

In the Specification,

In Column 2, Line 2, delete "takeoff There" and insert -- takeoff. There --, therefor.

Signed and Sealed this
Eighth Day of September, 2015

Michelle K. Lee
*Director of the United States Patent and Trademark Office*